United States Patent
Kolman et al.

(10) Patent No.: US 10,015,185 B1
(45) Date of Patent: Jul. 3, 2018

(54) RISK SCORE AGGREGATION FOR AUTOMATED DETECTION OF ACCESS ANOMALIES IN A COMPUTER NETWORK

(71) Applicant: EMC Corporation, Hopkinton, MA (US)

(72) Inventors: Eyal Kolman, Raanana (IL); Kineret Raviv, Herzeliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 201 days.

(21) Appl. No.: 15/079,228

(22) Filed: Mar. 24, 2016

(51) Int. Cl.
*H04L 29/06* (2006.01)

(52) U.S. Cl.
CPC .......... *H04L 63/1433* (2013.01); *H04L 63/08* (2013.01); *H04L 63/1416* (2013.01); *H04L 63/1425* (2013.01)

(58) Field of Classification Search
CPC . H04L 63/1433; H04L 63/08; H04L 63/1416; H04L 63/1425
USPC ........................................................ 726/23
See application file for complete search history.

(56) References Cited

U.S. PATENT DOCUMENTS

| | | | | |
|---|---|---|---|---|
| 5,819,226 A | * | 10/1998 | Gopinathan | G06Q 20/00 705/44 |
| 6,064,972 A | * | 5/2000 | Jankowitz | G06Q 10/0635 379/93.02 |
| 6,505,039 B1 | | 1/2003 | Boatwright | |
| 7,908,645 B2 | * | 3/2011 | Varghese | G06Q 20/341 715/773 |
| 8,112,546 B2 | * | 2/2012 | Razmov | H04L 67/22 709/223 |

(Continued)

FOREIGN PATENT DOCUMENTS

| | | |
|---|---|---|
| CN | 101349987 A | 1/2009 |
| JP | 2002297543 A | 10/2002 |

(Continued)

OTHER PUBLICATIONS

Dorothy E. Denning, "An Intrusion-Detection Model," IEEE Transactions on Software Engineering, Feb. 1987, pp. 222-232, vol. SE-13, No. 2.

(Continued)

*Primary Examiner* — Michael S McNally
(74) *Attorney, Agent, or Firm* — Ryan, Mason & Lewis, LLP

(57) ABSTRACT

A processing device in one embodiment comprises a processor coupled to a memory and is configured to generate access profiles for respective user identifiers, to obtain data characterizing a current access for a given one of the user identifiers, to extract a plurality of features from the data characterizing the current access for the given user identifier, and to generate feature risk scores based on the extracted features and the access profile for the given user identifier. The processing device is further configured to aggregate the feature risk scores into a composite risk score. The aggregation illustratively comprises weighting the feature risk scores as a function of their relative levels of riskiness. The composite risk score is compared to a threshold, and an alert is generated relating to the current access based on a result of comparing the composite risk score to the threshold.

20 Claims, 2 Drawing Sheets

(56) References Cited

U.S. PATENT DOCUMENTS

| | | | | |
|---|---|---|---|---|
| 9,015,792 | B2* | 4/2015 | Serrano | G06F 21/577 |
| | | | | 726/1 |
| 9,106,422 | B2* | 8/2015 | Varghese | H04L 9/3231 |
| 2006/0272024 | A1* | 11/2006 | Huang | G06F 21/55 |
| | | | | 726/26 |
| 2008/0162338 | A1 | 7/2008 | Samuels et al. | |
| 2009/0157573 | A1* | 6/2009 | Anderson | G06N 99/005 |
| | | | | 706/12 |
| 2011/0035444 | A1* | 2/2011 | Hill | G06Q 10/10 |
| | | | | 709/204 |
| 2014/0230051 | A1 | 8/2014 | Vallinayagam et al. | |
| 2015/0161394 | A1 | 6/2015 | Ferragut et al. | |
| 2015/0256550 | A1* | 9/2015 | Taylor | H04L 67/18 |
| | | | | 726/23 |
| 2016/0358099 | A1* | 12/2016 | Sturlaugson | G06N 5/043 |

FOREIGN PATENT DOCUMENTS

| | | |
|---|---|---|
| JP | 2005301928 A | 10/2005 |
| WO | 2015043491 A1 | 4/2015 |

OTHER PUBLICATIONS

J.M. Benitez et al., "Are Artificial Neural Networks Black Boxes?" IEEE Transactions on Neural Networks, Sep. 1997, pp. 1156-1164, vol. 8, No. 5.

RSA Security Analytics, "Detect & Investigate Threats." Data Sheet, Oct. 2013, 6 pages.

Y. Wang, "A Multinomial Logistic Regression Modeling Approach for Anomaly Intrusion Detection," Computers and Security, Nov. 2005, pp. 662-674, vol. 24, No. 8.

D. Canali et al., "On the Effectiveness of Risk Prediction Based on Users Browsing Behavior," Proceedings of the 9th ACM Symposium on Information, Computer and Communications Security, Jun. 2014, pp. 171-182.

Y. Carlinet et al., "Analysis of Computer Infection Risk Factors Based on Customer Network Usage," Proceedings of the Second International Conference on Emerging Security Information, Systems and Technologies (SECURWARE), Aug. 2008, pp. 317-325, Cap Esterel, France.

U.S. Appl. No. 14/869,354, filed Sep. 29, 2015 and entitled "Automated Detection of Time-Based Access Anomalies in a Computer Network Through Processing of Login Data."

\* cited by examiner

RISK SCORE AGGREGATION FOR AUTOMATED DETECTION OF ACCESS ANOMALIES IN A COMPUTER NETWORK

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, fraudulent access attempts made by human users or possibly by networks of compromised computers or "botnets."

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, conventional credential-based authentication techniques and other traditional defenses typically deployed by enterprise network security systems today often fail at detecting and remediating access anomalies at a sufficiently early stage.

SUMMARY

Illustrative embodiments of the invention provide techniques for automated detection of access anomalies in a computer network using risk score aggregation. For example, some embodiments are configured to aggregate feature risk scores by weighting the feature risk scores as a function of their relative levels of riskiness. Such arrangements supplement conventional credential-based authentication techniques and advantageously provide enhanced security against APTs and other types of attacks in enterprise computer networks.

In one embodiment, a processing device comprises a processor coupled to a memory and is configured to generate access profiles for respective user identifiers, to obtain data characterizing a current access for a given one of the user identifiers, to extract a plurality of features from the data characterizing the current access for the given user identifier, and to generate feature risk scores based on the extracted features and the access profile for the given user identifier. The processing device is further configured to aggregate the feature risk scores to form a composite risk score. The aggregation illustratively comprises weighting the feature risk scores as a function of their relative levels of riskiness.

The composite risk score is compared to a threshold, and an alert is generated relating to the current access based on a result of comparing the composite risk score to the threshold. The alert is transmitted over at least one network to a security agent.

A given processing device configured with functionality for automated detection of access anomalies utilizing risk score aggregation may be implemented, for example, in one or more network devices of a computer network, or in a security analytics system or other type of network security system associated with the computer network.

These and other illustrative embodiments include, without limitation, methods, apparatus, networks, systems and processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
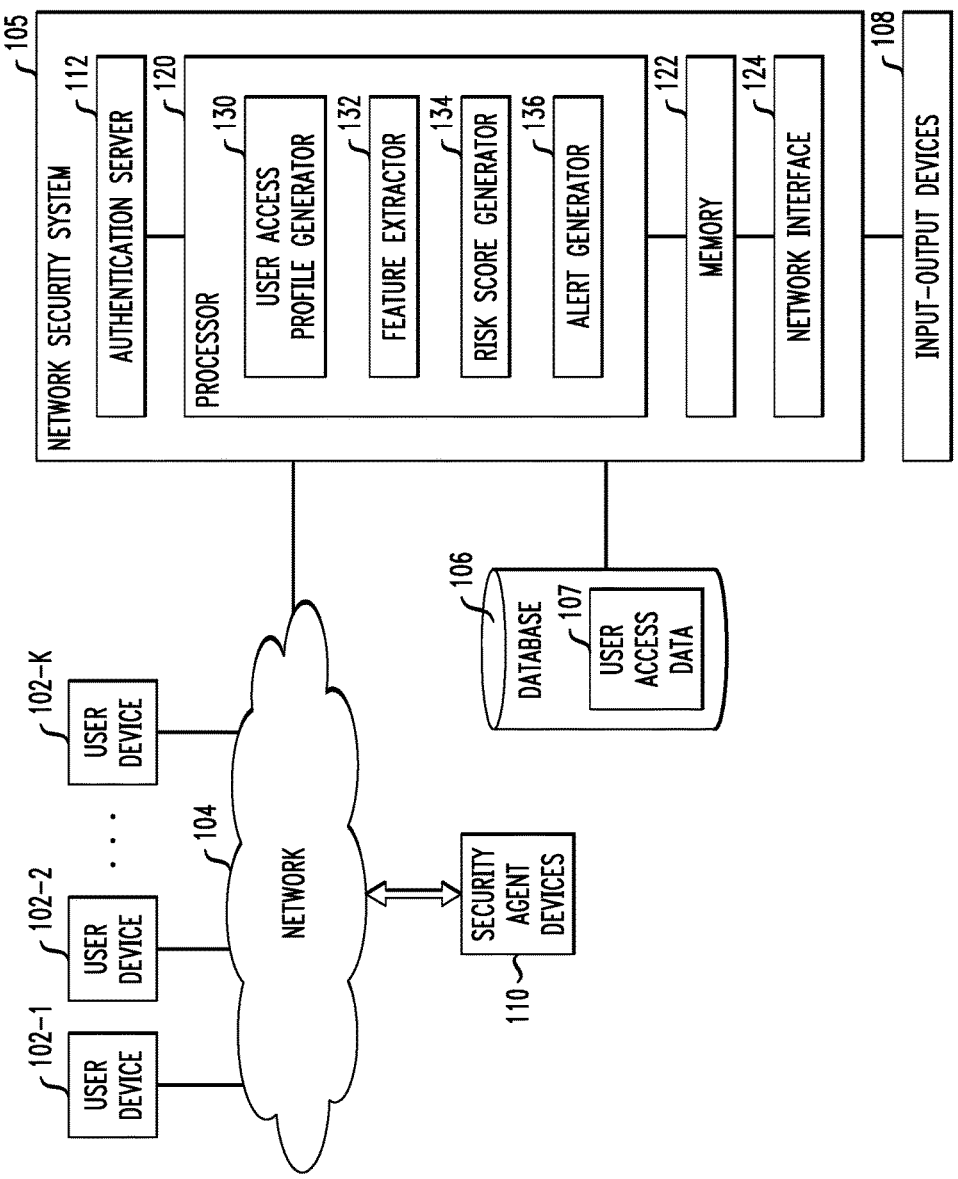
FIG. 1 is a block diagram of a computer network configured for automated detection of access anomalies using risk score aggregation in an illustrative embodiment of the invention.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The network security system 105 has an associated database 106 configured to store user access data 107 for each of a plurality of distinct user identifiers. Such user access data can illustratively comprise network sessions data, login data or other types of data characterizing user access to protected resources within the computer network 100, as well as various combinations of multiple distinct types of such data. Network sessions data can include, for example, virtual private network (VPN) session data for VPN connections initiated within the computer network 100. Login data can include, for example, authentication data or other types of login data including timestamps and other information associated with login events. Numerous other types of user access data can be used in a given embodiment.

The database 106 in the present embodiment is implemented using one or more storage systems associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment.

As indicated previously, the user access data 107 in some embodiments illustratively comprises respective timestamps and other authentication information characterizing successful logins processed in conjunction with users attempting to access protected resources of the computer network 100 via the user devices 102. Other types of login events, network session events or other access events can be processed in computer network 100 in order to generate user access data 107.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

In the present embodiment, alerts generated by the network security system 105 are provided over the network 104 to one or more security agent devices 110. Such devices, like the user devices 102, can illustratively comprise mobile telephones, laptop computers, tablet computers, desktop computers, or other types of computers or processing devices configured for communication over network 104 with the network security system 105. For example, a given security agent device can comprise a mobile telephone equipped with a mobile application configured to receive alerts from the network security system 105 and to provide an interface for a security agent to select particular remedial measures for responding to the alert. Examples of such remedial measures may include logging off the user device in question, or requiring various additional authentication factors for subsequent access attempts made from the user device in question.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

The network security system 105 comprises an authentication server 112. Login events initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors. Upon verification of the presented authentication factors, the authentication server 112 grants the requesting user device 102 access to one or more protected resources of the computer network 100. Although shown as an element of the network security system 105 in this embodiment, the authentication server 112 in other embodiments can be implemented at least in part externally to the network security system 105, for example, as a stand-alone server, set of servers or other type of authentication system coupled to the network 104.

In the FIG. 1 embodiment, a successful access attempt is assumed to represent a login event for the corresponding user identifier and is logged in the database 106 as part of the user access data 107. Other types of authentication mechanisms and associated login events or other user access data can be used in other embodiments.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102 and the security agent devices 110, and illustratively comprises one or more conventional transceivers.

The processor 120 further comprises a user access profile generator 130, a feature extractor 132, a risk score generator 134 and an alert generator 136.

The user access profile generator 130 is configured to generate access profiles for respective user identifiers. Such an access profile for a given user identifier is typically based on user access data from multiple user accesses attributed to that same user identifier. Each of the user identifiers illustratively identifies a particular user associated with at least a corresponding one of the user devices 102. In addition, at least a subset of the user accesses utilized to generate the access profiles in the user access profile generator are illustratively initiated from the user devices 102 over the network 104. As noted above, the user access data 107 illustratively includes information relating to login events associated with respective logins initiated from user devices 102 over the network 104, although additional or alternative types of user access data could be processed in other embodiments. The processed user access data illustratively comprises at least portions of the user access data 107 stored in the database 106, although user access data can be captured and stored for subsequent processing in the network security system 105 of the computer network 100 in other ways.

Examples of access profiles that may be utilized in a given embodiment include login profiles, network session profiles or other types of profiles characterizing user access to protected resources in the computer network 100.

A given access profile illustratively comprises a plurality of histograms for respective ones of a plurality of features extracted at least in part from user access data characterizing multiple user accesses for a given one of the user identifiers. Such feature extraction is assumed to be performed by the feature extractor 132 operating in conjunction with the user access profile generator 130.

The feature extractor 132 is further configured to obtain data characterizing a current access for the given user identifier and to extract features from the data characterizing the current access for the given user identifier.

The risk score generator 134 generates feature risk scores for the current access based on the features extracted from the data characterizing the current access for the given user identifier and the access profile for the given user identifier. The risk score generator 134 is further configured to aggregate the feature risk scores to form a composite risk score. This aggregating is illustratively performed by weighting the feature risk scores as a function of their relative levels of riskiness.

Such an arrangement provides robust risk aggregation that overcomes potential disadvantages of arrangements in which feature risk scores are averaged or combined through a weighted sum. For example, assume that there is only a single feature risk score due to missing data. An average in this case gives a composite risk score that is the same as the single feature risk score even though the single feature risk score may be unreliable. As a more particular example, assume that the feature risk scores are in the range [0, 100] and compare a first case in which there is a single feature risk score having a value of 95 to a second case in which there are twenty different feature risk scores each having a value of 95. In both of these cases, an average gives the same composite risk score of 95, but the second case is clearly more risky than the first case.

Accordingly, this type of average or weighted sum risk aggregation can yield inaccurate composite risk scores when not all of the feature risk scores are populated, leading to false alerts and lower access anomaly detection rates. Although this issue can be addressed to some extent by assigning default feature risk scores for use when such scores are missing, determining a suitable default feature risk score is a challenging task and in many cases a default feature risk score will tend to generate biases.

As another example, in some attack scenarios, not all of the feature risk scores are expected to be high. Nonetheless, the composite risk score should still be high regardless of the existence of several low feature risk scores. Consider an impersonation attack that involves infecting one of the user devices 102 and utilizing that device to carry out malicious activities within the computer network 100. In this type of attack, it is expected that behavior-related feature risk scores will be high. These include feature risk scores for behaviors such as accessing new servers, extracting unusually high amounts of data and carrying out unexpected activities. Other feature risk scores such as device-based scores, location-based scores and activity-hours-based scores are expected to be low since the attacker is using a legitimate user device, from its appropriate location, during the normal working hours for the corresponding user.

Aggregating the feature risk score using an average or weighted sum could allow the low feature risk scores to unduly reduce the overall composite risk score, thereby preventing detection of the attack in this particular example.

The robust risk aggregation provided by risk score generator 134 in illustrative embodiments advantageously overcomes these and other drawbacks associated with aggregating feature risk scores based on an average or weighted sum. Additional details regarding the robust risk aggregation will be described below in conjunction with FIG. 2.

The alert generator 136 is configured to compare the composite risk score to a threshold, and to generate an alert relating to the current access based on a result of the comparison. The alert in the present embodiment is assumed to be transmitted via the network interface 124 over the network 104 to a security agent associated with one of the security agent devices 110. In other embodiments, multiple alerts of different types can be generated relating to the current access.

Additional description regarding more detailed examples of user access profiles, extracted features, risk scores and comparison thresholds that are used in illustrative embodiments will be provided below.

The arrangement described above advantageously permits the network security system 105 to focus its efforts on the particular ones of the user devices 102 that are most likely to be subject to attacks. Accordingly, the limited resources of the network security system 105 available for attack detection and remediation can be more intelligently and effectively deployed in the computer network 100, resulting in improved performance as well as enhanced security against APTs and other types of attacks.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the user access profile generator 130, feature extractor 132, risk score generator 134 and alert generator 136 may be implemented at least in part in the form of software that is stored in memory 122 and executed by processor 120. Similarly, at least portions of the authentication server 112 of the network security system 105 can be implemented at least in part in the form of software that is stored in memory 122 and executed by processor 120.

It is to be understood that the particular set of elements shown in FIG. 1 for automatically detecting access anomalies involving user devices 102 of computer network 100 and for automatically implementing remedial measures based on the detected access anomalies is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and associated elements such as authentication server 112, user access profile generator 130, feature extractor 132, risk score generator 134 and alert generator 136 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated authentication server 112 as part of or in conjunction with a security information and event management (SIEM) system, such as the enVision® platform, also commercially available from RSA. Such an SIEM system is also considered another possible example of a "network security system" as that term is broadly used herein. In an embodiment of this type, at least portions of the user access data 107 stored in the database 106 illustratively comprise security logs collected by the SIEM system.

An exemplary process utilizing user access profile generator 130, feature extractor 132, risk score generator 134 and alert generator 136 of the network security system 105 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 210. These steps are assumed to be performed by the processor 120 utilizing its modules 130, 132, 134 and 136.

In step 200, access profiles are generated for respective user identifiers. The access profiles are illustratively generated for a given one of the user identifiers by user access profile generator 130 using corresponding portions of user access data 107 relating to multiple accesses for the given user identifier. The user identifier may comprise a username or other type of user identifying information as well as combinations of multiple instances of such information of different types. The term "user identifier" is therefore intended to be broadly construed. The access profile for the given user identifier illustratively comprises a plurality of histograms for respective ones of a plurality of features extracted by the feature extractor 132 from portions of the user access data 107 relating to multiple accesses for the given user identifier. Thus, the user access profile generator 130 operates in conjunction with the feature extractor 132 in generating the access profiles in the present embodiment.

In step 202, data characterizing a current access for a given one of the user identifiers is obtained and features are extracted from the data by the feature extractor 132. The features extracted from the current access in this embodiment illustratively include the same set of features that were extracted from other accesses for the given user identifier in generating the corresponding access profile.

In step 204, feature risk scores are generated by the risk score generator 134 for respective ones of the extracted features and the access profile for the given user identifier. The feature risk scores are then aggregated into a composite risk score as a function of their respective levels of riskiness. Such aggregation of feature risk scores into a composite risk score is an example of what is also referred to herein as "robust risk aggregation." Robust risk aggregation tends to provide more accurate detection of access anomalies with fewer false alerts. Moreover, it avoids the need to specify default feature risk scores for use when not all of the feature risk scores are populated.

In some embodiments, robust risk aggregation utilizes a risk aggregation function that is configured in the following manner. Let $s(x_1, x_2, \ldots, x_n)$ be a risk aggregation function that computes an aggregated risk score over a set of feature risk scores $x_i$. The risk aggregation function s is illustratively configured to satisfy the following properties:

1. Strict monotonicity: $x_1 > x_2 \Rightarrow s(x_1, y_1, \ldots, y_n) > s(x_2, y_1, \ldots, y_n)$.
2. A larger number of high feature risk scores indicates a higher level of composite risk: $s(0.9, 0.9) > s(0.9)$.
3. High composite risk scores can occur even when not all feature risk scores are populated: $s(0.9, \text{Null}, \text{Null}) \neq s(0.9, 0, 0)$.
4. A low feature risk score does not result in low composite risk: $s(0.9, 0.1) \approx s(0.9)$ and not $s(0.9, 0.1) << s(0.9)$.
5. A single feature risk score cannot unduly dominate the composite risk score: $s(1) < s(0.9, 0.9)$.
6. Low feature risk scores count less towards the composite risk score: $s(0.9, 0.1) > s(0.8, 0.3)$.
7. The feature risk scores should have different weights. The weights illustratively comprise distribution-based weights due to difficulties in obtaining prior knowledge.

A risk aggregation function satisfying all or a subset of the above-listed properties can provide significantly improved detection of access anomalies while avoiding at least some of the previously-described drawbacks of simple average or weighted sum aggregation.

In applying the risk aggregation function, it is desirable in some embodiments to confirm the presence of a threshold minimum number of feature risk scores prior to aggregating the feature risk scores to form the composite risk score. Accordingly, the feature risk scores in some embodiments are aggregated using the risk aggregation function responsive to the confirmed presence of the threshold minimum number of feature risk scores. If the threshold minimum number of feature risk scores is not present, alternative risk aggregation techniques could be applied to the current access for the given user identifier.

It should also be noted that a given feature risk score can be generated as a function of multiple ones of the extracted features. Other feature risk scores can each be generated based on a corresponding single one of the extracted features. Accordingly, the term "feature risk score" as used herein is intended to be broadly construed, and should not be interpreting as relating to only a single extracted feature.

An example of an embodiment of a robust risk aggregation approach that satisfies most of the properties 1 through 7 listed above involves sorting the feature risk scores in order of riskiness, and calculating a weighted sum of the sorted feature risk scores as a function of their respective sorted positions. In this example, sorting the feature risk scores in order of riskiness illustratively comprises sorting the feature risk scores in order of decreasing riskiness, although other types of sorting arrangements can be used in other embodiments. The weights applied to the sorted feature risk scores in calculating the weighted sum are predetermined for respective ones of the sorted positions. More particularly, a designated number of the sorted positions illustratively have the same predetermined weight and remaining ones of the sorted positions have decreasing predetermined weights.

A more specific implementation of the above-described example is as follows:

1. Sort the feature risk scores from the most risky to the least risky.
2. Require a minimal number of populated feature risk scores (e.g., at least 3 scores), otherwise no aggregated risk score is generated.
3. Calculate a weighted sum of the scores based on their sorted positions. The weights are illustratively configured such that the first X weights are the same and then the weights decrease with position in the sorted list. For example, for a list of 7 feature risk scores sorted in order of decreasing riskiness, the weights can be [1, 1, 1, ½, ¼, ⅛, 1/16] where the first weight is for the largest feature risk score, the seventh weight is for the smallest feature risk score, and in general the i-th weight is for the feature risk score at position i after sorting by the feature risk scores in decreasing order of their respective risk values.

An advantage of this sorting-based approach is its simplicity. It is similar in operation to a simple weighted sum but the weights are set as a function of the relative riskiness of the feature risk scores. Moreover, as indicated previously, it satisfies most of the above-listed properties of the desired risk aggregation function.

Another example of a risk aggregation approach that can be applied in illustrative embodiments involves applying a risk normalization transformation to each of at least a subset of the feature risk scores, and then aggregating the transformed feature risk scores. This risk aggregation approach can be configured to satisfy all of the listed properties of the desired risk aggregation function.

In this example, applying a risk normalization transformation to each of at least a subset of the feature risk scores more particularly comprises applying a risk normalization transformation to at least a given one of the feature risk scores in accordance with the following equation:

$$r = (r_{max} - r_{min}) \cdot \frac{\exp(-\alpha(1 - r_{old})) - e^{-\alpha}}{1 - e^{-\alpha}} + r_{min},$$

where $r_{old}$ is the given feature risk score, r is the transformed feature risk score, and a is a factor denoting importance of the given feature risk score relative to other ones of the feature risk scores, and wherein r is in the range [$r_{min}$, $r_{max}$]. The factor α can be determined from the risk distribution of the feature risk scores and in some embodiments can incorporate prior knowledge if available. This same risk normalization transformation is illustratively applied to all of the feature risk scores that are to be aggregated in accordance with the risk aggregation function, although other arrangements are possible.

In addition, aggregating the transformed feature risk scores illustratively comprises aggregating the transformed feature risk scores utilizing an interactive- or aggregation function. For example, aggregating the transformed feature risk scores utilizing an interactive- or aggregation function illustratively comprises aggregating the transformed feature risk scores in accordance with the following equation:

$$s = \frac{(\prod r_i)^p}{(\prod r_i)^p + (\prod (1 - r_i))^p},$$

where $r_i$ denotes a particular one of the transformed feature risk scores, s denotes the aggregated transformed feature risk scores, and p is a parameter of the interactive- or aggregation function.

It can be shown that the normalization and aggregation operations in the foregoing example generate a composite risk score that satisfies all of the above-listed properties 1 through 7 of the desired risk aggregation function. Specifically, the normalization operation satisfies properties 5, 6 and 7, and the aggregation operation satisfies properties 1 through 4. This approach generates aggregated risk scores that provide higher accuracy, lower rates of false alerts and reduced instances of misdetection.

A number of other risk normalization transformations can be used to implement the normalization operation in other embodiments. For example, possible alternative risk normalization transformations include a linear transformation such as $r=(r_{max}-r_{min}) \cdot r_{old}+r_{min}$ or a power-based transformation such as $r=(r_{max}-r_{min}) \cdot r_{old}^a+r_{min}$, where a is a positive number. Also, other types of aggregation can be used to implement the aggregation operation, including, for example, a simple weighted average such as $s=\Sigma_i w_i r_i$ with $\Sigma_i w_i =1$, a geometric weighted average such as $s=(\Pi_i r_i^{c_i})^{\Sigma_i c_i}$ and an extreme-based aggregation such as $$s = \max_i r_i \text{ or } s = \min_i r_i.$$

It is to be appreciated that the particular types of example robust risk aggregation described above are presented for purposes of illustration only, and should not be construed as limiting in any way. Numerous other techniques can be used to aggregate multiple feature risk scores to generate a composite risk score in other embodiments.

In step 206, the composite risk score is compared to a threshold and an alert is generated for the current access based on a result of comparing the risk score to the threshold. For example, the alert may be generated if the composite risk score exceeds the threshold. The composite risk score referred to in this step is illustratively a composite risk score generated by robust risk aggregation of the individual feature risk scores computed for respective ones of the extracted features.

It is assumed in the present embodiment that the current access is processed in real time by the network security system 105, responsive to initiation of the current access within the computer network 100. In other embodiments, the current access can be processed as part of a batch of additional accesses retrieved from the database 106 at one of a plurality of periodic processing intervals. The network security system 105 can therefore be configured to support a real-time processing mode of operation, a batch processing mode of operation, or combinations of real-time processing, batch processing or other types of processing modes.

In some embodiments, generating an alert relating to the current session based on a result of comparing the risk score to the threshold comprises generating multiple alerts, possibly based on comparisons of the composite risk score and one or more portions thereof to different thresholds. Accordingly, multiple alerts can be generated relative to respective different thresholds in some embodiments.

In step 208, the alert is provided to a security agent and one or more automated remedial actions are taken in the network security system 105. For example, the alert may be transmitted over the network 104 to one of the security agent devices 110. The automated remedial actions can illustratively include, for example, requiring submission of one or more additional authentication factors from a given one of the user devices 102 that is determined to be associated with an anomalous access. Such remedial actions can include terminating the current access or suspending the current access until the one or more additional authentication factors are obtained and verified.

In step 210, one or more user access profiles for respective ones of the user identifiers are updated. For example, the access profiles can be continuously or periodically tuned based on one or more additional accesses that occur for a particular user identifier within the computer network 100.

Additional instances of steps 200 through 210 can be performed responsive to occurrence of additional accesses for respective user identifiers or may otherwise be repeated periodically in order to ensure that access anomalies are accurately and efficiently detected within the computer network 100.

Numerous other techniques can be used in association with detection of access anomalies through processing of data characterizing multiple user accesses for each of a plurality of user identifiers. For example, alternative processes can include other types and arrangements of automated remedial actions in response to a detected access anomaly.

Figure 2:
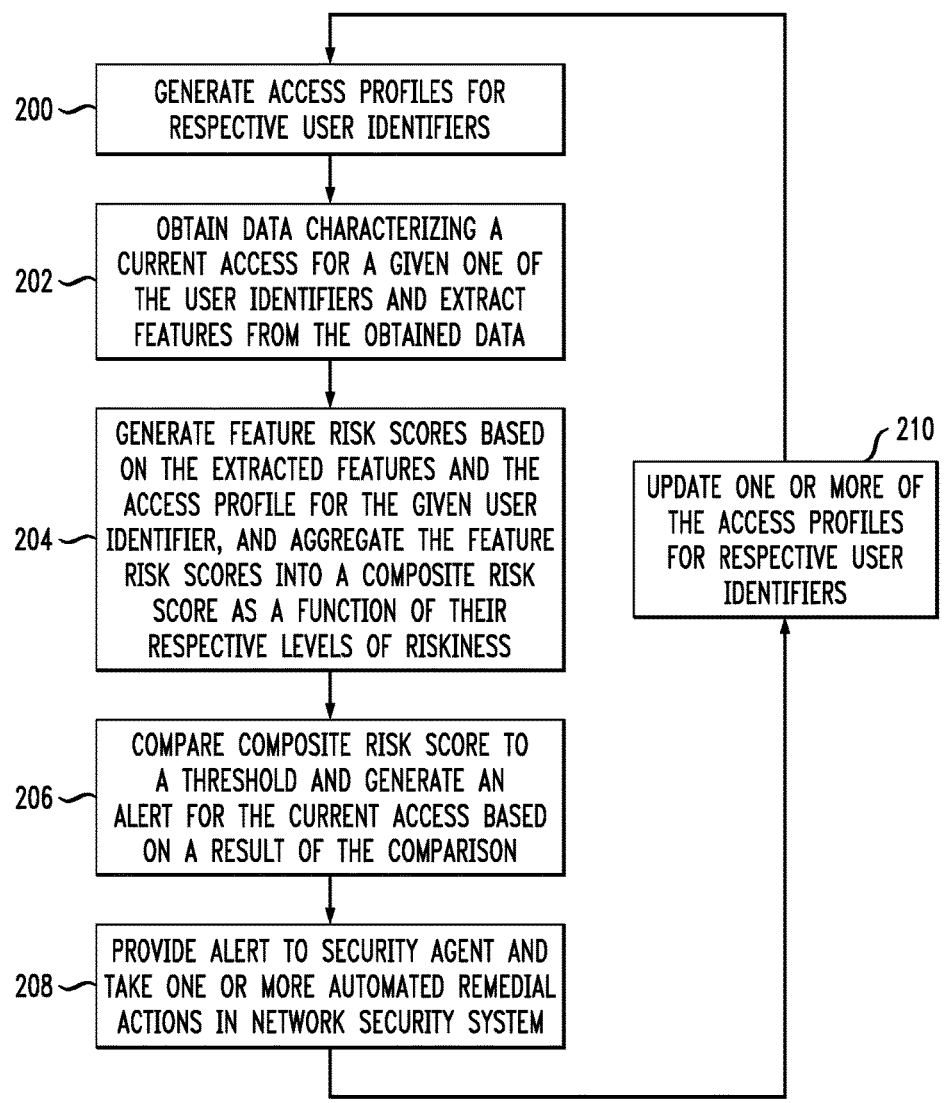
FIG. 2 is a flow diagram of a process for automated detection of access anomalies using risk score aggregation in an illustrative embodiment.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of anomaly detection, possibly for different user identifiers.

Again, the particular feature extraction, risk score computation and alert generation arrangements described above and shown in the Appendix are exemplary only, and numerous alternative processing arrangements can be used in other embodiments. Accordingly, the various characteristics of these embodiments are intended to be illustrative only and should not be construed as limiting in any way.

The above-described illustrative embodiments provide significant advantages relative to conventional approaches.

For example, some embodiments are configured to aggregate feature risk scores by weighting the feature risk scores as a function of their relative levels of riskiness. Such arrangements supplement conventional credential-based authentication techniques and advantageously provide enhanced security against APTs and other types of attacks in enterprise computer networks.

The robust risk aggregation applied in illustrative embodiments generates highly accurate composite risk scores that result in lower rates of false alerts and reduced numbers of misdetections.

These and other embodiments can effectively detect common attack vectors such as those that involve use of legitimate user credentials that are stolen by an attacker through phishing, breaking into credential databases, or infecting user devices with malware. The automated anomaly detection in illustrative embodiments is data driven and can detect an attack at an early stage of penetration before an attacker can cause further damage from within an internal network of an enterprise.

Automated detection of access anomalies using robust risk score aggregation in some embodiments is implemented as an additional protective measure to supplement conventional credential-based authentication. Drawbacks of conventional credential-based authentication can therefore be avoided in illustrative embodiments. Accordingly, security is improved and the probability of detecting a given attack at an early stage is increased. Furthermore, the risk analysis in some embodiments is applied in a backend network security system and the process is transparent with no adverse impact on usability for legitimate users.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, access profiles, risk scores, thresholds, alerts and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method for automated detection of access anomalies in at least one network, the method comprising steps of:
generating access profiles for respective user identifiers;
obtaining data characterizing a current access for a given one of the user identifiers;
extracting a plurality of features from the data characterizing the current access for the given user identifier;
generating feature risk scores based on the extracted features and the access profile for the given user identifier;
aggregating the feature risk scores to form a composite risk score wherein the aggregating comprises weighting the feature risk scores as a function of their relative levels of riskiness;
comparing the composite risk score to a threshold; and
generating an alert relating to the current access based on a result of comparing the composite risk score to the threshold;
wherein the alert is transmitted over said at least one network to a security agent;
wherein aggregating the feature risk scores comprises:
sorting the feature risk scores in order of riskiness; and
calculating a weighted sum of the sorted feature risk scores as a function of their respective sorted positions; and
wherein the steps are performed by at least one processing device comprising a processor coupled to a memory.

2. The method of claim 1 wherein sorting the feature risk scores in order of riskiness comprises sorting the feature risk scores in order of decreasing riskiness.

3. The method of claim 1 wherein weights applied to the sorted feature risk scores in calculating the weighted sum are predetermined for respective ones of the sorted positions.

4. The method of claim 3 wherein a designated number of the sorted positions have the same predetermined weight and remaining ones of the sorted positions have decreasing predetermined weights.

5. The method of claim 1 wherein at least one of the feature risk scores is generated as a function of multiple ones of the extracted features.

6. The method of claim 1 wherein at least one of the feature risk scores is generated based on a corresponding single one of the extracted features.

7. The method of claim 1 wherein the composite risk score exhibits strict monotonicity as a function of the feature risk scores.

8. A method for automated detection of access anomalies in at least one network, the method comprising steps of:
generating access profiles for respective user identifiers;
obtaining data characterizing a current access for a given one of the user identifiers;
extracting a plurality of features from the data characterizing the current access for the given user identifier;
generating feature risk scores based on the extracted features and the access profile for the given user identifier;
aggregating the feature risk scores to form a composite risk score wherein the aggregating comprises weighting the feature risk scores as a function of their relative levels of riskiness;

comparing the composite risk score to a threshold; and
generating an alert relating to the current access based on a result of comparing the composite risk score to the threshold;
wherein the alert is transmitted over said at least one network to a security agent;
wherein the method further comprises confirming presence of a threshold minimum number of feature risk scores prior to aggregating the feature risk scores to form the composite risk score such that the feature risk scores are aggregated responsive to the confirmed presence of the threshold minimum number of feature risk scores; and
wherein the steps are performed by at least one processing device comprising a processor coupled to a memory.

9. A method for automated detection of access anomalies in at least one network, the method comprising steps of:
generating access profiles for respective user identifiers;
obtaining data characterizing a current access for a given one of the user identifiers;
extracting a plurality of features from the data characterizing the current access for the given user identifier;
generating feature risk scores based on the extracted features and the access profile for the given user identifier;
aggregating the feature risk scores to form a composite risk score wherein the aggregating comprises weighting the feature risk scores as a function of their relative levels of riskiness;
comparing the composite risk score to a threshold; and
generating an alert relating to the current access based on a result of comparing the composite risk score to the threshold;
wherein the alert is transmitted over said at least one network to a security agent;
wherein aggregating the feature risk scores comprises:
applying a risk normalization transformation to each of at least a subset of the feature risk scores; and
aggregating the transformed feature risk scores; and
wherein the steps are performed by at least one processing device comprising a processor coupled to a memory.

10. The method of claim 9 wherein applying a risk normalization transformation to each of at least a subset of the feature risk scores comprises applying a risk normalization transformation to at least a given one of the feature risk scores in accordance with the following equation:

$$r = (r_{max} - r_{min}) \cdot \frac{\exp(-\alpha(1 - r_{old})) - e^{-\alpha}}{1 - e^{-\alpha}} + r_{min},$$

where $r_{old}$ is the given feature risk score, r is the transformed feature risk score, and $\alpha$ is a factor denoting importance of the given feature risk score relative to other ones of the feature risk scores, and wherein r is in the range $[r_{min}, r_{max}]$.

11. The method of claim 9 wherein aggregating the transformed feature risk scores comprises aggregating the transformed feature risk scores utilizing an interactive- or aggregation function.

12. The method of claim 11 wherein aggregating the transformed feature risk scores utilizing an interactive- or aggregation function comprises aggregating the transformed feature risk scores in accordance with the following equation:

$$s = \frac{(\prod r_i)^p}{(\prod r_i)^p + (\prod (1 - r_i))^p},$$

where $r_i$ denotes a particular one of the transformed feature risk scores, s denotes the aggregated transformed feature risk scores, and p is a parameter of the interactive- or aggregation function.

13. A non-transitory processor-readable storage medium having stored therein program code of one or more software programs, wherein the program code when executed by at least one processing device causes said at least one processing device:
to generate access profiles for respective user identifiers;
to obtain data characterizing a current access for a given one of the user identifiers;
to extract a plurality of features from the data characterizing the current access for the given user identifier;
to generate feature risk scores based on the extracted features and the access profile for the given user identifier;
to aggregate the feature risk scores to form a composite risk score wherein the aggregating comprises weighting the feature risk scores as a function of their relative levels of riskiness;
to compare the composite risk score to a threshold; and
to generate an alert relating to the current access based on a result of comparing the composite risk score to the threshold;
wherein the alert is transmitted over said at least one network to a security agent; and
wherein the program code when executed by said at least one processing device causes said at least one processing device to aggregate the feature risk scores by:
sorting the feature risk scores in order of riskiness; and
calculating a weighted sum of the sorted feature risk scores as a function of their respective sorted positions.

14. The processor-readable storage medium of claim 13 wherein the program code when executed by said at least one processing device causes said at least one processing device to aggregate the feature risk scores by:
applying a risk normalization transformation to each of at least a subset of the feature risk scores; and
aggregating the transformed feature risk scores.

15. An apparatus comprising:
at least one processing device comprising a processor coupled to a memory;
said at least one processing device being configured:
to generate access profiles for respective user identifiers;
to obtain data characterizing a current access for a given one of the user identifiers;
to extract a plurality of features from the data characterizing the current access for the given user identifier;
to generate feature risk scores based on the extracted features and the access profile for the given user identifier;
to aggregate the feature risk scores to form a composite risk score wherein the aggregating comprises weighting the feature risk scores as a function of their relative levels of riskiness;
to compare the composite risk score to a threshold; and
to generate an alert relating to the current access based on a result of comparing the composite risk score to the threshold;
wherein the alert is transmitted over said at least one network to a security agent; and wherein aggregating the feature risk scores comprises:
sorting the feature risk scores in order of riskiness; and
calculating a weighted sum of the sorted feature risk scores as a function of their respective sorted positions.

16. The apparatus of claim 15 wherein aggregating the feature risk scores comprises:
applying a risk normalization transformation to each of at least a subset of the feature risk scores; and
aggregating the transformed feature risk scores.

17. A network security system comprising the apparatus of claim 15.

18. The apparatus of claim 15 wherein said at least one processing device is further configured to confirm presence of a threshold minimum number of feature risk scores prior to aggregating the feature risk scores to form the composite risk score such that the feature risk scores are aggregated responsive to the confirmed presence of the threshold minimum number of feature risk scores.

19. The apparatus of claim 15 wherein the composite risk score exhibits strict monotonicity as a function of the feature risk scores.

20. The apparatus of claim 15 wherein said at least one processing device is further configured to execute one or more automated remedial actions responsive to the alert and wherein the one or more automated remedial actions comprise at least one of:
terminating the current access; and
suspending the current access until one or more specified authentication factors are obtained and verified for the given user identifier.

* * * * *